Dec. 11, 1923.

G. B. GRIFFIN

ROTARY TOASTER STOVE

Filed Dec. 16, 1920

1,477,343

WITNESSES:

INVENTOR
George Brewer Griffin
BY
ATTORNEY

Patented Dec. 11, 1923.

1,477,343

UNITED STATES PATENT OFFICE.

GEORGE BREWER GRIFFIN, OF SPRINGFIELD, MASSACHUSETTS, ASSIGNOR TO WESTINGHOUSE ELECTRIC PRODUCTS COMPANY, A CORPORATION OF MICHIGAN.

ROTARY-TOASTER STOVE.

Application filed December 16, 1920. Serial No. 431,066.

*To all whom it may concern:*

Be it known that I, GEORGE BREWER GRIFFIN, a citizen of the United States, and a resident of Springfield, in the county of Hampden and State of Massachusetts, have invented a new and useful Improvement in Rotary-Toaster Stoves, of which the following is a specification.

My invention relates to electrically heated apparatus and particularly to electric toasters, and it has for one of its objects to provide a rotary electric toaster.

Another object of my invention is to provide a rotary electric toaster which shall embody means for causing the rotation of one of the parts of the toaster relative to the other part.

Heretofore, in the ordinary type of electric toaster used on the table, the toasting took place while the material was stationary relative to the heating element and the only movement was that of inserting and removing the successive pieces of material.

In practicing my invention, I provide a suitable base member and mount thereon a heating element and a material carrying member, the rotation of one of which relative to the other is effected by embodying means in a cover member that is actuated by the current of heated air rising from the heating element. I provide, also, means for carrying the device and means for holding pieces of material until desired for use.

In the single sheet of drawings.

Figure 1:
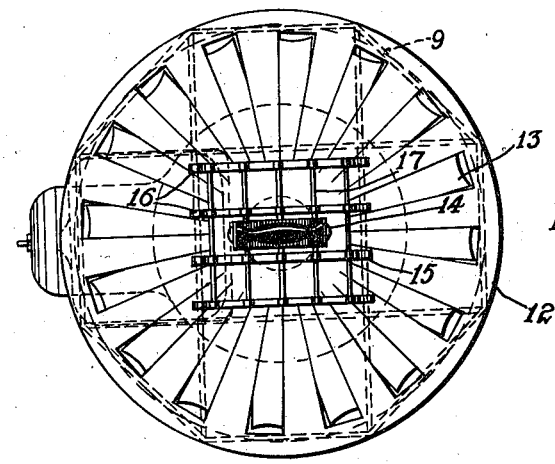
Figure 1 is a top plan view of a device embodying my invention.

A base member 1 of any suitable shape, which is here shown as of substantially circular contour, is provided with a lateral extension 2. A vertically extending supporting member 3 is made integral with the members 1 and 2, as by being cast therewith. The extension 3 is provided with interfitting members 4 and 4a which are adjustable relatively to each other and to the member 3 and which may be clamped in any desired position by a clamping screw 4b. The members 4 and 4a are so arranged as to support electrical heating elements 5. These heating elements may be of any suitable or desired contour and construction and will, therefor, not be described in detail here. However, in general, they may be of open type and arranged to radiate their heat directly on the material to be toasted as will hereinafter be further set forth.

A suitable switching device 6, giving one or more heating values may be mounted in the base member 1 and a contact socket 7 may be provided in the extension 2. While I have shown a specific location for the switching device 6 and the contact socket 7, I do not desire to be limited to the location shown, as these are illustrative only. Suitable means may be provided to permit the arrangement of the heating elements in a vertical plane relative to each other and to the other parts of the device.

While I have shown a plurality of oppositely spaced heating elements 5, covering substantially only one-fourth of the area, I may provide a larger number of such sets of heating elements as by providing another set diametrically opposite the first set shown in the drawings or I may provide an even larger number, as for instance, 3 sets. It is only necessary to leave free a peripheral space sufficiently large to permit of inserting and of removing the pieces of material. In this connection, it may be noted also that, as the number of heating elements is increased, the speed with which the slices of bread are toasted is also increased, and that, by regulating the heat or the speed of the revolving member, one may obtain toast of any desired crispness.

The base member 1 is provided with a vertically extending shaft member 8 on which is suitably secured a material carrying member 9 which may comprise a plurality of suitably connected rod members 9a, so arranged as to form an open rack, here shown as being substantially octagonal in outline. However, the general outline is not important in connection with the design or operation of the device and is dicated more particularly by considerations of beauty of design as it is intended that this device shall be placed upon the table in the home.

A suitable bearing member 10 is provided, upon which the rack 9 may be rotated in a manner to be hereinafter set forth.

The base member 1 is further provided with a substantially circular crumb tray 11 which is of use not only in receiving any crumbs falling from the material being toasted, but is also useful in conserving the heat, as well as giving a more finished appearance to the entire device.

Figure 2:
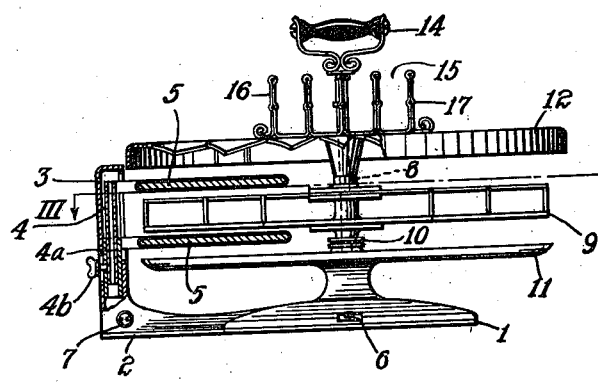
Fig. 2 is a view, partly in side elevation and partly in vertical cross-section, of the device shown in Fig. 1.
Figure 3:
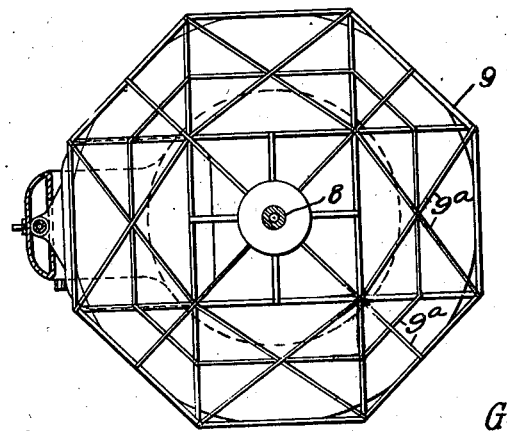
Fig. 3 is a view taken on the line III—III of Fig. 2.

A cover member 12 is mounted upon the shaft 8 and is so arranged as to rotate with the material supporting rack 9. As shown in Fig. 2, the cover member 12 comprises a relatively shallow member of relatively thin material, as for instance, sheet metal. A plurality of vanes 13 are punched in the top of the member 12 and are so shaped as to act substantially as fan blades for a purpose to be hereinafter set forth. While I have shown the cover member 12 as comprising the vanes 13 integral therewith, this is not necessary and I may use any suitable construction wherein a plurality of angularly disposed fan members 13 are provided, either integral with the cover member 12 or suitably secured thereto.

A suitable handle member 14 is provided on the cover member 12. The design of the co-operating parts of the base, the bearing, the material supporting rack and the cover member is such that the device may be carried by means of the handle member 14. An ornamental rack member 15 is suitably secured to the cover member 12 and comprises a plurality of metal strips 16 so bent as to provide a plurality of frames of substantially U-shape and a plurality of metal tie rods 17. The member 15 provides a means for holding pieces of material which have been toasted.

When the heating element 5 is energized currents of heated air will rise substantially vertically therefrom and will impinge upon the vanes 13 and cause the cover member 12 and the material supporting rack 9 to rotate. The speed of rotation is proportional to the quantity of heated air arising from the heating means 5 and the amount of friction in the roller bearing 10. The speed may be varied, within certain limits, by placing a greater or a lesser number of slices of bread in the material supporting rack 9 or by placing slices of fresh or of toasted bread in the rack 15 upon the cover member 12.

While I have shown the heating means 5 as located in a substantially horizontal position, I do not desire to be limited to such position, as I may mount these in a substantially vertical position and so arrange the material supporting rack that the slices of bread are also in a substantially vertical position and they rotate between the heating elements 5.

It will be seen that the use of the device embodying my invention provides a means of rotating the material to be toasted relative to the heating means which is actuated by currents of heated air caused by the heating elements during their normal operation of toasting the material placed in the material carrying rack provided for that purpose.

While I have shown a specific form of the device embodying my invention, various modifications may be made therein without departing from the spirit and scope of my invention, and I desire that only such limitations shall be placed thereon as are imposed by the prior art or are specifically set forth in the appended claims.

I claim as my invention:

1. In an electrical toaster, the combination with a plurality of heating elements and a material-carrier, of means actuated by said heating means for causing said carrier to rotate material placed therein relatively to said heating elements.

2. In an electric toaster, the combination with a base, a crumb tray and a heating element, both said tray and element being mounted on said base, of a material-carrying member, and a cover therefor, both said carrying member and said cover being rotatable on said base.

3. In an electric toaster, the combination with a base, a crumb tray and a heating element, both said tray and said element being secured to said base and supported thereby, of a material-carrying member, a cover member therefor, and means associated with said cover member and actuated by said heating element for causing said material-carrying member to rotate relatively to said heating element.

4. In an electric toaster, the combination with a base, a crumb tray and a heating element, all of said members being stationary relatively to each other, of a material-carrying member, a cover member, means for rotatably supporting said carrying member and said cover on said base and means on said cover actuated by said heating element to cause said carrying member and said cover to rotate on said base.

5. In an electric toaster, the combination with a base, a crumb tray and a plurality of parallel-extending heating elements, said tray and said heating elements being mounted on said base, of a material-carrying member adapted to rotate relative to said heating elements, a cover member, and means embodied in said cover actuated by said heating element to rotate said cover member and said material-carrying member.

6. In an electric toaster, the combination with a base, and a plurality of heating elements, of a vertically extending shaft secured to said base, a bearing on said base, a material-carrying member supported by said bearing, and means located above said heating elements and said carrying member for rotating said material-carrying member on said bearing.

7. In an electric toaster, the combination with a vertically extending shaft secured to said base, and a bearing on said base, of a material-carrying member rotatably supported by said bearing, a plurality of heating elements located on opposite sides of said material-carrying member, a cover member, and means embodied in said cover member, actuated by said heating elements, to cause said cover member and said material-carrying member to rotate on said bearing.

8. An electrically heated toaster comprising a rotatable material-carrying member and a plurality of spaced electric heating elements, said heating elements being adjustable relative to each other and to the material-carrying member.

9. An electrically heated toaster comprising a rotatable material-carrying member and a plurality of horizontally extending spaced electric heating elements, said heating elements being adjustable in a vertical plane relative to each other and to the material-carrying member.

10. In an electric toaster, the combination with a base and a heating means supported by said base, of a material-carrying member, a cover member, means for rotatably supporting said material-carrying member and said cover member on said base, and means secured to said cover member for holding material.

In testimony whereof, I have hereunto subscribed my name this twenty-sixth day of November 1920.

GEORGE BREWER GRIFFIN.